(12) United States Patent
Seregin et al.

(10) Patent No.: US 10,701,391 B2
(45) Date of Patent: Jun. 30, 2020

(54) MOTION VECTOR DIFFERENCE (MVD) PREDICTION

(71) Applicant: QUALCOMM Incorporated, San Diego, CA (US)

(72) Inventors: Vadim Seregin, San Diego, CA (US); Yu-Chen Sun, Bellevue, WA (US); Yi-Wen Chen, San Diego, CA (US); Wei-Jung Chien, San Diego, CA (US); Xin Zhao, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 15/933,070

(22) Filed: Mar. 22, 2018

(65) Prior Publication Data

US 2018/0278951 A1    Sep. 27, 2018

Related U.S. Application Data

(60) Provisional application No. 62/475,801, filed on Mar. 23, 2017.

(51) Int. Cl.
*H04N 19/52* (2014.01)
*H04N 19/70* (2014.01)
(Continued)

(52) U.S. Cl.
CPC ........... *H04N 19/52* (2014.11); *H04N 19/176* (2014.11); *H04N 19/44* (2014.11); *H04N 19/46* (2014.11); *H04N 19/70* (2014.11); *H04N 19/567* (2014.11)

(58) Field of Classification Search
USPC .................................................... 375/240.16
See application file for complete search history.

(56) References Cited

U.S. PATENT DOCUMENTS

| 4,533,957 A * | 8/1985 | Iinuma | G06T 9/005 |
| | | | 358/426.12 |
| 2013/0235936 A1* | 9/2013 | Campbell | H04N 19/52 |
| | | | 375/240.16 |

(Continued)

FOREIGN PATENT DOCUMENTS

| EP | 3300366 A1 | 3/2018 |
| WO | 2017043769 A1 | 3/2017 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(Continued)

*Primary Examiner* — Behrooz M Senfi
(74) *Attorney, Agent, or Firm* — Shumaker & Sieffert, P.A.

(57) ABSTRACT

Techniques are described to increase the coding efficiency of information indicating a sign of a motion vector difference (MVD) component. A video coder may determine a MVD component sign predictor, and determine whether the MVD component sign predictor is the MVD component sign based on an indicator that is transmitted or received. In some examples, the indicator may be context coded, which promotes coding efficiencies.

24 Claims, 7 Drawing Sheets

(51) Int. Cl.
*H04N 19/44* (2014.01)
*H04N 19/176* (2014.01)
*H04N 19/46* (2014.01)
*H04N 19/567* (2014.01)

(56) References Cited

U.S. PATENT DOCUMENTS

2016/0219290 A1 7/2016 Zhao et al.
2018/0220159 A1* 8/2018 Won .................... H04N 19/146
2019/0289317 A1* 9/2019 Hsu ..................... H04N 19/52

OTHER PUBLICATIONS

Henry et al., "Residual Coefficient Sign Prediction", Joint Video Exploration Team (JVET) of ITU-T SG 16 WP 3 and ISO/IEC JTC 1/SC 29/WG 11, 4th Meeting: Chengdu, CN, Oct. 15-21, 2016, 6 Pages. JVET-D0031.
International Search Report and Written Opinion—PCT/US2018/024066—ISA/EPO—dated Jul. 30, 2018 (21 pp).
Partial International Search Report—PCT/US2018/024066—ISA/EPO—dated Jun. 7, 2018 (16 pp).
Prabhu K.A., "A Predictor Switching Scheme for DPCM Coding of Video Signals," IEEE Transactions on Communications, vol. COM-33 (4), Apr. 1, 1985, pp. 373-379, XP002301635.

* cited by examiner

MOTION VECTOR DIFFERENCE (MVD) PREDICTION

This application claims the benefit of U.S. Provisional Application No. 62/475,801, filed Mar. 23, 2017, the entire contents of which are hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to inter prediction and inter related information coding. As one example, this disclosure describes example techniques related to motion vector difference (MVD) sign prediction or magnitude prediction. Although described with respect to MVD sign prediction or magnitude prediction, the example techniques may be applicable to other types of information used for encoding or decoding.

The MVD is the difference between a motion vector predictor (MVP) for a current block and the actual motion vector (MV) for the current block. The MVD includes an x-component and a y-component, and each of the x-component and y-component has a magnitude (e.g., numerical value) and sign (e.g., positive or negative).

In one or more examples, a video coder (e.g., video encoder or video decoder) determines an MVD component sign predictor. The MVD component sign predictor is a predictor of what the sign of an x-component or y-component should be. The video coder may also code (e.g., encode or decode) an indicator that indicates whether the MVD component sign predictor is correct or incorrect (e.g., whether the MVD component sign predictor equals the actual sign of the MVD or does not equal to the actual sign of the MVD). The video decoder may determine the MVD for the current block based on the MVD component sign predictor and the indicator. In some examples, the video coder may context-based code the indicator, which may reduce the number of bits that need to be signaled as compared to bypass-based coding the indicator.

In one example, the disclosure describes a method of decoding video data, the method comprising determining a motion vector difference (MVD) component sign predictor, receiving an indicator indicative of whether an MVD component sign is equal to the MVD component sign predictor, determining the MVD component sign based on the MVD component sign predictor and the indicator, determining an MVD for a current block based on the determined MVD component sign, and reconstructing the current block based on the determined MVD.

In one example, the disclosure describes a method of encoding video data, the method comprising determining a motion vector difference (MVD) component sign for an MVD for a current block, determining an MVD component sign predictor, determining an indicator indicative of whether the MVD component sign is equal to the MVD component sign predictor, and signaling information corresponding to the indicator In one example, the disclosure describes an apparatus for decoding video data, the apparatus comprising one or more storage media configured to store video data, and a video decoder coupled to the one or more storage media and comprising one or more fixed-function or programmable processing circuits. The video decoder is configured to determine a motion vector difference (MVD) component sign predictor, receive an indicator indicative of whether an MVD component sign is equal to the MVD component sign predictor, determine the MVD component sign based on the MVD component sign predictor and the indicator, determine an MVD for a current block based on the determined MVD component sign, and reconstruct the current block based on the determined MVD.

In one example, the disclosure describes a computer-readable storage medium storing instructions thereon that when executed cause one or more processors of an apparatus for decoding video data to determine a motion vector difference (MVD) component sign predictor, receive an indicator indicative of whether an MVD component sign is equal to the MVD component sign predictor, determine the MVD component sign based on the MVD component sign predictor and the indicator, determine an MVD for a current block based on the determined MVD component sign, and reconstruct the current block based on the determined MVD.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
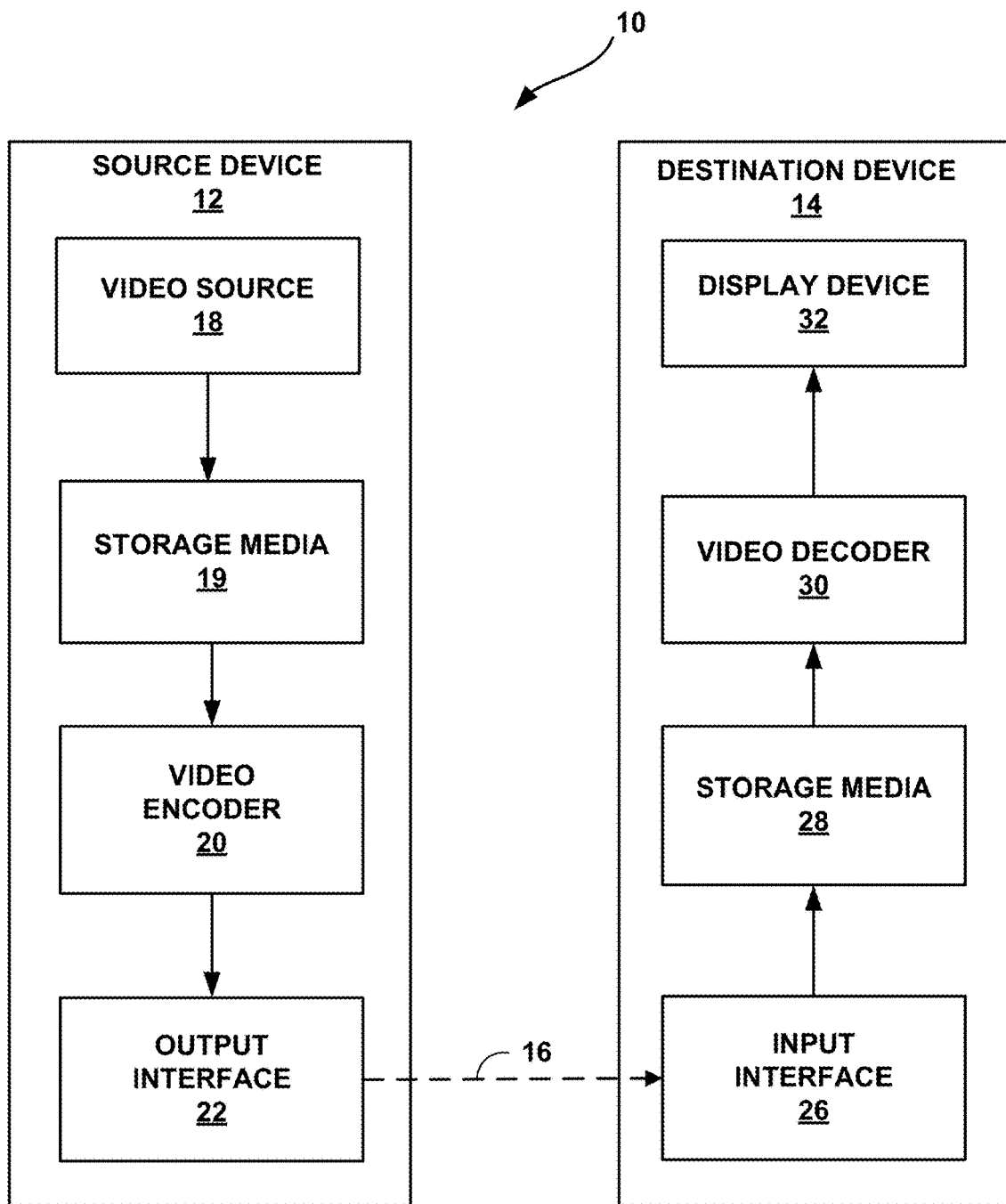
FIG. 1 is a block diagram illustrating an example video encoding and decoding system that may use one or more techniques described in this disclosure.

Video coding techniques utilize inter-prediction as one example way in which to encode or decode a current block of video data. In inter-prediction, a video encoder determines a residual block based on a difference between a current block and a block in a reference picture. A motion vector (MV) for the current block identifies the block in the reference picture. The video encoder may signal information indicating the residual block and the motion vector, instead of the pixel values of the current block. The video decoder then reconstructs the current block based on the residual block and the block in the reference picture referred to by the MV (e.g., by summing values in the residual block and the block in the reference picture). Signaling the MV and the residual block may require fewer bits than signaling the actual pixel values of the current block.

To further reduce the number of signaled bits, rather than signaling information indicating the MV, the video encoder may signal information indicating a difference between the MV and a motion vector predictor (MVP). The difference between the MV and the MVP is referred to as a motion vector difference (MVD). For example, MVD+MVP=MV. The video decoder may receive information, such as an index corresponding to an entry in a candidate list of MVPs, from which the video decoder determines the MVP. The video decoder also receives information indicative of the MVD, and based on the MVP and MVD, the video decoder determines the MV. The video decoder then reconstructs the current block with the MV.

An MV, MVP, and MVD can each include two components: an x-component and a y-component. Each x-component and y-component has a magnitude (e.g., numerical value) and sign (e.g., positive or negative). In some techniques, the video encoder may signal information indicative of the magnitude of each of the MVD components, and information indicative of the sign of each of the MVD components.

In these techniques, the video encoder may bypass-code, i.e., the bins are coded without using a context such there may not be a basis in value (e.g., a 50% probability of a binary value being equal to one), the sign information for each of the MVD components. However, context-based coding techniques tend to reduce the number of bits that need to be signaled as compared to bypass-coding techniques. Accordingly, there may be benefits in context-based coding the sign information for the MVD components.

When performing context-based coding a condition that causes the sign information to be biased in one direction (e.g., more likely to be positive or more likely to be negative) improves the entropy coding because the probability of the bin (e.g., probability of whether the bin is one or zero) can be determined based on previously processed bins and the probability of any given binary value may be less than or greater than 50%. However, in techniques where the video encoder signals the sign information, there may be no bias in the sign information (e.g., 50% likelihood that the sign is positive, and 50% likelihood that the sign is negative). Therefore, techniques that signal sign information with no bias may not be able to use context-based coding for sign information and/or may be not be able to as efficiently use context-based coding compared to techniques, as described in further detail below, that can signal sign information that is biased in one direction. Thus, techniques that can signal sign information that is biased in one direction solve technical problems related to the use of context-based coding.

This disclosure describes example techniques for context-based coding sign information. As described in this disclosure, a video coder (e.g., video encoder or video decoder) may determine a MVD component sign predictor from one or more MVD candidates. For example, the MVD component sign predictor may correspond to the sign of the MVD candidate that provides a more optimum coding metric. The video coder may also determine whether the MVD component sign predictor is actually equal to the MVD component sign.

In one example, a video encoder may signal and a video decoder may receive an indicator (e.g., syntax element or flag) indicative of whether an MVD component sign is equal to the MVD component sign predictor. The video decoder may determine the MVD component sign based on the MVD component sign predictor and the indicator and determine the MVD for the current block based on the determined MVD component sign.

As an example, assume that the actual MVD component sign for the x-component of the MVD is positive. In one case, a video coder may determine that the MVD component sign predictor for the x-component is negative. In this example, the video encoder may signal and the video decoder may receive the indicator that indicates that the MVD component sign is not equal to the MVD component sign predictor. In one case, a video coder may determine that the MVD component sign predictor for the x-component is positive. In this example, the video encoder may signal and the video decoder may receive the indicator that indicates that the MVD component sign is equal to the MVD component sign predictor.

By using an MVD component sign predictor, the indicator indicative of whether the MVD component sign is equal to the MVD component sign predictor may be biased. For example, there may be higher likelihood that MVD component sign is equal to the MVD component sign predictor, or there may be higher likelihood that MVD component sign is not equal to the MVD component signal predictor. Therefore, the video coder may context-based code the indicator, which potentially reduces the number of bits that need to be signaled.

In this way, the example techniques may provide a technical solution by allowing for context-based coding techniques to be utilized for determining the signs of MVD components. For example, using MVD sign predictors enables the use of context-based coding techniques to encode or decode the indicator indicative of whether the MVD component sign (e.g., actual MVD component sign) is equal to the MVD component sign predictor.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. Source device 12 provides the encoded video data to destination device 14 via a computer-readable medium 16. Source device 12 and destination device 14 may include any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a video coder or a "CODEC." Source device 12 and destination device 14 are examples of coding devices (encoding and/or decoding devices) in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may include a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may include various types of components or devices. For example, output interface 22 may include a wireless transmitter, a modem, a wired networking component (e.g., an Ethernet card), or another physical component. In examples where output interface 22 includes a wireless transmitter, output interface 22 may be configured to transmit data, such as encoded video data, modulated according to a cellular communication standard, such as 4G, 4G-LTE, LTE Advanced, 5G, and the like. In some examples where output interface 22 includes a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may include any type of medium or device capable of moving the encoded video data from source device 12 to destination device 14. In some examples, computer-readable medium 16 includes a communication medium to enable source device 12 to transmit encoded video data directly to destination device 14 in real-time. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may include one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may include various types of components or devices. For example, input interface 26 may include a wireless receiver, a modem, a wired networking component (e.g., an Ethernet card), or another physical component. In examples where input interface 26 includes a wireless receiver, input interface 26 may be configured to receive data, such as the bitstream, modulated according to a cellular communication standard, such as 4G, 4G-LTE, LTE Advanced, 5G, and the like. In some examples where input interface 26 includes a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may include any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC).

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in an bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may include an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block includes residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may include one or more CTBs and may include syntax structures used to encode the samples of the one or more CTBs. For instance, a CTU may include a CTB of luma samples, two corresponding CTBs of chroma samples, and syntax structures used to encode the samples of the CTBs. In monochrome pictures or pictures having three separate color planes, a CTU may include a single CTB and syntax structures used to encode the samples of the CTB. A CTU may also be referred to as a "tree block" or a "largest coding unit"

(LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may include one or more coding blocks and syntax structures used to encode samples of the one or more coding blocks. For example, a CU may include a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may include a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may include one or more prediction blocks of a CU and syntax structures used to predict the one or more prediction blocks. For example, a PU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction_unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block.

Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may include one or more transform blocks. For example, a TU may include a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may include a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may include an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, video encoder 20 and video decoder 30 may apply CABAC encoding and decoding to syntax elements. To apply CABAC encoding to a syntax element, video encoder 20 may binarize the syntax element to form a series of one or more bits, which are referred to as "bins." In addition, video encoder 20 may identify a coding context (also called symbol or bin probability). The coding context may identify probabilities of bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context (also called symbol or bin probability). Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

Video encoder 20 may encode some bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), ITU-T H.265 (also known as HEVC), including extensions such as Scalable Video Coding (SVC), Multi-view Video Coding (MVC) and Screen content coding (SCC).

It also includes future video coding standards, such as JVET test model, which is the development activity beyond HEVC. Video coding standards also include proprietary video codecs, such Google VP8, VP9, VP10 and video codecs developed by other organizations, for example, Alliance for Open Media.

In HEVC and examples of the Joint Exploratory Model (JEM) used by the JVET as a test model, motion vector difference (MVD), which is the difference between a motion vector (MV) to be used to derive inter predictor and its motion vector predictor (MVP), is signaled in a bitstream to video decoder 30. MV, MVP, and MVD are vectors and have two components: horizontal and vertical. When MVDx (e.g., x-component of MVD) or MVDy (e.g., y-component of MVDy) is not equal to zero, its sign is signaled. Usually, the sign is signaled using CABAC bypass mode (not context coded).

For example, as part of inter prediction, video encoder 20 determines a MV for a current block. However, rather than signaling the vector components of the MV for the current block, there may be bit savings by signaling an MVD between the MV and the MVP. There may be various example ways in which to determine the MVP. As one example, as part of advanced motion vector prediction (AMVP) mode, video encoder 20 constructs a list of candidate MVPs based on motion vectors of neighboring blocks. In such examples, the MVD is the difference between the MV and an MVP from the list of candidate MVPs.

Video decoder 30 may similarly construct a list of candidate MVPs (e.g., using the same process as video encoder 20) so that the list of candidate MVPs at video decoder 30 is the same as the list of candidate MVPs at video encoder 20. Video encoder 20 may signal an index corresponding to an entry in the list of candidate MVPs that indicates where in the list of candidate MVPs the MVP for the current block is located. For example, if the MVP that video encoder 20 selects is in the first entry of the list of candidate MVPs, video encoder 20 may signal a "0" as the index. From the index, video decoder 30 determines the MVP for the current block and adds the MVP to the MVD that video encoder 20 signals to determine the MV for the current block.

In HEVC, a translational motion model is used for motion compensated prediction (MCP) (e.g., inter prediction). While in the real world, there are many kinds of motions, e.g. zoom in/out, rotation, perspective motions and the other irregular motions. In JEM, a simplified affine transform motion compensation prediction is applied to improve the coding efficiency. Affine transform is another example of inter prediction (e.g., affine transform mode is another type of inter prediction mode). As shown FIG. 2, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Figure 2:
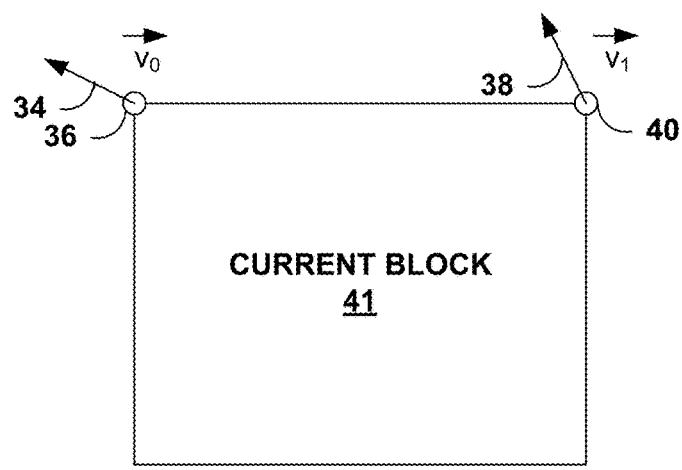
FIG. 2 is a conceptual diagram illustrating a simplified affine motion model.

FIG. 2 illustrates current block 41 having control points 36 and 40. In FIG. 2, $(v_{0x}, v_{0y})$ is the motion vector 34 of the top-left corner control point 36, and $(v_{1x}, v_{1y})$ is the motion vector 38 of the top-right corner control point 40. The MVF of current block 41 indicates motion vectors for sub-blocks within current block 41. For example, $(v_x, v_y)$ defines a motion vector for a sub-block located at (x, y) within current block 41. Video encoder 20 and video decoder 30 may perform inter-prediction techniques based on the MVF for the sub-blocks of current block 41.

In some examples, video encoder 20 signals information indicative of the values of $(v_{0x}, v_{0y})$ for motion vector 34 and $(v_{1x}, v_{1y})$ for motion vector 38. However, to reduce the amount of information that needs to be signaled, similar to the AMVP mode, video encoder 20 may signal information indicative of an MVP (e.g., index corresponding to an entry in the list of candidate MVPs) and MVD. Video decoder 30 may then determine the motion vector for the control points (e.g., top-left corner control point 36 and top-right corner control point 40) from respective MVPs and MVDs (e.g., one MVP and MVD for MV 34 for top-left corner control point 36, and one MVP and MVD for MV 38 for top-right corner control point 40).

In the above examples, the MVD includes an x-component (MVDx) and a y-component (MVDy). MVDx and MVDy each include a magnitude and sign. In one or more examples described in this disclosure, rather than simply signaling the magnitude and sign information, the example techniques describe ways in which to use prediction techniques to determine the magnitude and sign of MVDx and MVDy.

Video encoder 20 and video decoder 30 may not necessarily apply prediction techniques for both magnitude and sign and may perform prediction techniques for one of magnitude and sign. However, performing the example prediction techniques for both magnitude and sign are possible.

Furthermore, under certain conditions described in more detail, video encoder 20 and video decoder 30 may not perform the prediction techniques. For instance, if the magnitude of MVDx or MVDy is less than a threshold, then video encoder 20 and video decoder 30 may not perform the prediction techniques.

Prior to describing example prediction techniques for determining sign and magnitude of MVDx and MVDy, the following describes some example techniques for indicating magnitude and sign for coefficient blocks (e.g., the blocks resulting from the transform of a TU or after quantization). To improve the coding efficiency for sign bit information, coefficient sign prediction methods have been proposed in the literature. In some techniques, such as in Felix Henry, Gordon Clare, "Residual Coefficient Sign Prediction", Joint Video Exploration Team (WET) of ITU-T SG 16 WP 3 and ISO/IEC JTC 1/SC 29/WG 11, Doc. JVET-D0031, October 2016, (hereinafter WET-D0031) a sign prediction method has been proposed on top of JEM. Basically, to predict the sign for one coefficient, the TB (e.g., possibly the transform block, which is part of the TU) is reconstructed using both positive value and negative value for this sign, and each block reconstruction using a candidate sign value is called a hypothesis reconstruction. The two hypothesis reconstructions are evaluated by a given spatial-domain cost function, and the hypothesis which minimizes the cost function gives the predicted sign value.

Furthermore, to predict multiples signs for a TB, e.g., N signs, the TB is reconstructed using different combinations of candidate sign prediction values, which includes $2^N$ different hypothesis reconstructions. Similarly, each hypothesis is evaluated by a given spatial-domain cost function, and the hypothesis which minimizes the cost function gives the predicted sign value combination.

The cost function is typically measuring spatial discontinuity between previously reconstructed neighbor pixels and the currently tested reconstructed block using one of the hypotheses. The hypothesis which shows the smoothest pixel value transition at the block boundary of the current block is considered to be best prediction.

For example, in some techniques (e.g., JVET-D0031), the cost is measured using the leftmost and topmost pixels of a hypothesis reconstruction. One example of the hypothesis reconstruction and cost equation is illustrated in FIG. 5.

Figure 5:
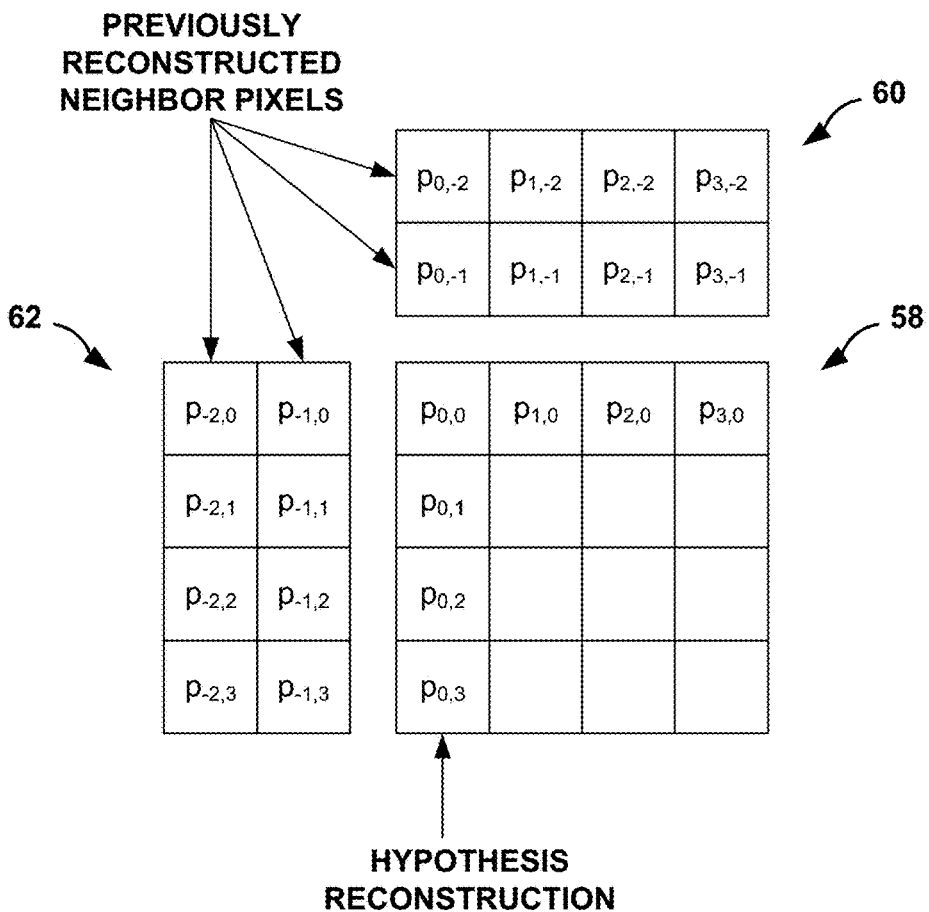
FIG. 5 is a conceptual diagram illustrating an example hypothesis reconstruction and cost equation.

FIG. 5 illustrates current block 58 having a top row of hypothesis reconstruction values of $p_{0,0}$ to $p_{3,0}$, which are based on the bottom two rows of top neighboring block 60, which are previously reconstructed neighboring pixels. Current block 58 also includes first column of hypothesis reconstruction values of $p_{0,0}$ to $p_{0,3}$, which are based on the right most two columns of left neighboring block 62, which are previously reconstructed neighboring pixels.

In a specific sign prediction scheme used in some techniques, video encoder 20 initially dequantizes the TU (e.g., transform unit) and then chooses n coefficients for which signs will be predicted. The coefficients are scanned in raster-scan order, and dequantized values over a defined threshold are preferred over values lower than that threshold when collecting the n coefficients to treat.

With these n values, $2^n$ simplified border reconstructions are performed as described below, with one reconstruction per unique combination of signs for the n coefficients. To reduce the complexity of performing sign prediction, a template-based hypothesis reconstruction is performed. For a particular hypothesis reconstruction, only the leftmost and topmost pixels of the block are recreated from the inverse transformation added to the block prediction. Although the first (vertical) inverse transform is complete, the second (horizontal) inverse transform only has to create the leftmost and topmost pixel outputs and is thus faster. An additional flag, "topLeft", has been added to inverse transform functions to allow this.

In addition, the number of inverse transform operations performed is reduced by using a system of 'templates'. In this way, when predicting n signs in a block, only n+1 inverse transform operations are performed:

1) A single inverse transform operating on the dequantized coefficients, where the values of all signs being predicted are set positive. Once added to the prediction of the current block, this corresponds to the border reconstruction for the first hypothesis.
2) For each of the n coefficients having their signs predicted, an inverse transform operation is performed on an otherwise empty block containing the corresponding dequantized (and positive) coefficient as its only non-null element. The leftmost and topmost border values are saved in what is termed a 'template' for use during later reconstructions.

Border reconstruction for a later hypothesis starts by taking an appropriate saved reconstruction of a previous hypothesis which only needs a single predicted sign to be changed from positive to negative in order to construct the desired current hypothesis. This change of sign is then approximated by the doubling and subtracting from the hypothesis border of the template corresponding to the sign being predicted. The border reconstruction, after costing, is then saved if it is known to be reused for constructing later hypotheses.

| Template Name | How to Create | |
|---|---|---|
| T001 | inv xform single +ve $1^{st}$ sign-hidden coeff | |
| T010 | inv xform single +ve $2^{nd}$ sign-hidden coeff | |
| T100 | inv xform single +ve $3^{rd}$ sign-hidden coeff | |
| Hypothesis | How to Create | Store for later reuse as |
| H000 | inv xform all coeffs add to pred | H000 |
| H001 | H000 − 2*T001 | |
| H010 | H000 − 2*T010 | H010 |
| H011 | H010 − 2*T001 | |
| H100 | H000 − 2*T100 | H100 |
| H101 | H100 − 2*T001 | |
| H110 | H100 − 2*T010 | H110 |
| H111 | H110 − 2*1001 | |

Table 1 showing save/restore and template application for a 3 sign 8 entry case

In some examples, these approximations may be used only during the process of sign prediction, not during final reconstruction.

For a transform coefficient with larger magnitude, the sign prediction is generally giving a better chance to achieve a correct prediction. This is because an incorrect sign prediction for a transform coefficient with larger magnitude typically shows more discrepancy on the boundary sample smoothness.

With sign prediction, instead of coding the explicit sign value, the correctness of sign prediction is coded. For example, for predicting a coefficient sign which actually has a positive value, if the predicted sign is also positive, i.e., the sign prediction is correct, a '0' bin is coded. Otherwise, if the predicted sign is negative, i.e., the sign prediction is not correct, a '1' bin is coded. In this way, the techniques may utilize the level value (magnitude) of the transform coefficient as the context for coding the correctness of sign prediction, since a larger magnitude of transform coefficient leans to a higher chance of '0' bin.

This disclosure discloses example techniques to predict signs (e.g., polarity) and magnitudes for MVDs. The description uses MVD as an example, however similar methods can be applied to other information. For example, such information can be other syntax elements signaled in the bitstream, or other elements that can be derived at video encoder 20 and/or video decoder 30 with signaling and so on. In a more specific example, the information can be a magnitude of a merge index.

The described techniques can be used to predict signs or other information, and some indicators can be signaled to identify whether the predictor matches the actual sign or other information. In another example, the described methods can be used to infer whether the sign is equal to the predictor, as described in further detail below.

The described techniques can be used in any combination, or other alternatives, which may not be explicitly described but derived from the provided examples, in conjunction with other methods or algorithms.

For MVD sign prediction or MVD sign inference, if the MVD component is not equal to zero, video encoder 20 may signal information for the MVD sign. In this disclosure, it is proposed that instead of signaling a sign per non-zero component, video encoder 20 may signal an indicator, for example a flag, which indicates whether the MVD component sign is equal to the predictor or not. For example, video encoder 20 may determine the actual MVD component sign and determine an MVD component sign predictor. As an example, based on various cost functions that balance coding complexity, video quality, and bitstream bandwidth, video encoder 20 may determine the MV for the current block, and the MVD for the current block based on the available MVPs and the MV. Video encoder 20 may determine the MVD component sign for the x-component and the y-component based on the determined MVD.

Video encoder 20 may perform a separate operation to determine the MVD component sign predictors for the signs of each of the two MVD components. The determination of the MVD component sign predictors may be based on already coded blocks.

Video decoder 30 may perform similar techniques as video encoder 20 to determine the MVD component sign predictor. As one example, video decoder 30 may be pre-configured to perform the same operations that video encoder 20 performed to determine the MVD component sign predictor, and may not need information from video encoder 20 on how to determine the MVD component sign predictor. As another example, video encoder 20 may signal information that instructs video decoder 30 on how to determine the MVD component sign predictor. Accordingly, in both examples, the MVD component sign predictor determined by both video encoder 20 and video decoder 30 is the same.

Video encoder 20 may signal an indicator that indicates whether the actual MVD component sign is equal to the MVD component sign predictor. For example, video encoder 20 may signal a MVD sign predictor flag as equal to 1 to indicate that the MVD component sign is equal to the MVD component sign predictor. In this example, if video encoder 20 signaled a 1 for each of the MVD component sign predictors, then video decoder 30 may set the MVD component signs equal to the MVD component sign predictors.

Otherwise, video encoder 20 may signal a predictor flag of 0 if the MVD component sign predictor is not equal to the actual MVD component sign. In such examples, video decoder 30 may set the MVD component sign to the opposite of the MVD component sign predictor. The predictor is derived both on the encoder (e.g., video encoder 20) and decoder side (e.g., video decoder 30) based on information available up to that point (e.g., already encoded or decoded blocks).

As one example, assume that the actual MVDx sign is negative, and the actual MVDy sign is positive. In this example, assume that the MVDx sign predictor is negative, and the MVDy sign predictor is negative. Therefore, video encoder 20 may signal an indicator (e.g., flag value of 1) for MVDx because the sign of the MVDx sign predictor (e.g., negative) is equal to the sign of the actual MVDx sign (e.g., negative). Video encoder 20 may signal an indicator (e.g., flag value of 0) for MVDy because the sign of the MVDy sign predictor (e.g., negative) is not equal to the sign of the actual MVDy sign (e.g., positive). In this example, for the sign of MVDx, video decoder 30 may set the sign of MVDx equal to the sign of the MVDx sign predictor because the indicator indicated that the sign of MVDx is equal to the sign of the MVDx sign predictor (e.g., the indicator indicated the MVDx sign predictor is correct). For the sign of MVDy, video decoder 30 may set the sign of MVDy to the opposite of the sign of the MVDy sign predictor because the indicator indicated that the sign of MVDy is not equal to the sign of the MVDy sign predictor (e.g., the indicator indicated that the MVDy sign predictor is incorrect).

There may be various ways in which video encoder 20 and video decoder 30 may determine the MVD component sign predictor. In one example, the sign predictor is obtained by performing block reconstruction with MVD candidates (using positive and negative sign values), and one candidate's sign is chosen to be a sign predictor. MVD candidates can be generated by adding all possible signs to the MVD component absolute value. For example, in one example, the absolute MVD value is (1, 1), then the MVD candidates can be (−1, 1), (1, −1), (1, 1), (−1, −1). One of those candidates is the real MVD, which should be set as the MVD sign predictor in the ideal case. If one of the components is zero, then there is no need to do sign prediction, and sign predictor flag may not be signaled for a zero MVD component.

Accordingly, video encoder 20 and video decoder 30 may be configured to determine MVD candidates. If the absolute MVD values is (MVDx, MVDy), then, in one example, the MVD candidates are: (+MVDx, +MVDy), (−MVDx, +MVDy), (+MVDx, −MVDy), and (−MVDx, −MVDy). Video encoder 20 and video decoder 30 may select the sign of one of the MVD candidates as the MVD component sign predictor. For instance, video encoder 20 and video decoder 30 may select the sign of MVDx and MVDy from the signs of the MVD candidates. As seen in this example, the MVD candidates include one or more MVDs having different signs for the MVD components. There may be other examples of the MVD candidates, such as a subset of the four example MVD candidates.

As described above, video encoder 20 and video decoder 30 may derive the MV candidate by adding the MVP to the MVD candidate. Inter prediction techniques are performed using the MV candidates. For example, the reconstructed residual, which may be signaled in the form of quantized transform coefficients, is added to the predictors, hence multiple reconstructed blocks are derived.

For example, video encoder 20 and video decoder 30 may each perform block reconstruction with the MVD candidates to generate reconstructed blocks. As one example, assume that the MVP is (MVPx, MVPy). Video encoder 20 and video decoder 30 may determine four motion vector candidates, MV1 to MV4, as follows: (MVPx−MVDx, MVPy−MVDy), (MVPx+MVDx, MVPy−MVDy), (MVPx−MVDx, MVPy+MVDy), and (MVPx+MVDx, MVPy+MVDy). Video encoder 20 and video decoder 30 may identify blocks for each of the motion vector candidates MV1 to MV4. Each of the identified blocks are referred to as reconstructed blocks.

Video encoder 20 and video decoder 30 may select one of the reconstructed blocks based on a metric. For instance, the best reconstructed block according to a particular measure or metric is selected, and component signs of the corresponding MVD candidate are chosen to be MVD sign predictors. Knowing the MVD sign predictors and the MVD sign predictor flags, the real MVD can be reconstructed. The reconstructed blocks that are reconstructed using different MV candidates need not necessarily be the same size as the current block. For example, the reconstructed part of the reconstructed blocks can be several rows and columns near the block boundaries to perform metric calculation. For simplicity, in some examples, only partial pixel samples are reconstructed to select the best MV candidate. For example, a block includes one or more pixel samples that represent the color of the pixels within the block. Partial pixel samples means that not all pixel samples of a block need to be reconstructed, and only a subset of the pixel samples of a block are reconstructed for purposes of determining the MVD sign predictors. In one example, for each MV candidate, only the partial pixel samples (e.g., which are a subset of the all the pixel samples in a block) located in the 4×4 blocks at the top and left boundary are reconstructed and the best MV candidate is selected using the reconstructed boundary pixels according to a particular measure or metric.

In other words, in the above example, for each possible MVD sign given a particular MVD magnitude, video encoder 20 and video decoder 30 may determine which MV provides the best results, and determine the MVD sign combination as the MVD component sign predictors for the two MVD components (e.g., MVDx and MVDy). As described above, video encoder 20 and video decoder 30 may determine motion vector candidates MV1 to MV4.

Video encoder 20 and video decoder 30 may determine the blocks in reference pictures to which each one of motion vector candidates MV1, MV2, MV3, and MV4 refer (e.g., reconstructed blocks). Based on the reconstructed blocks to which each one of MV1, MV2, MV3, and MV4 refer, video encoder 20 and video decoder 30 may determine which one of the four MVD values is the MVD component sign predictor. For example, assume that based on one or more metrics, described below, video encoder 20 and video decoder 30 determine that MV3 is the optimal choice. In this example, MV3 equals (MVPx−MVDx, MVPy+MVDy). Therefore, the MVDx sign predictor is negative, and the MVDy sign predictor is positive.

For instance, video encoder 20 and video decoder 30 may determine an MVD candidate for the selected reconstructed block. In this example, the selected reconstructed block is the block referred to by MV3. The MVD values used to determine MV3 were (−MVDx, +MVDy). Hence, video encoder 20 and video decoder 30 may determine the MVD candidate for the selected reconstructed blocks as (−MVDx, +MVDy). In this example, video encoder 20 and video decoder 30 may select the sign of the determined MVD candidate for the selected reconstructed block as the MVD component sign predictor. For example, the MVD component sign predictor for the x-component of the MVD is negative because −MVDx was selected, and the MVD component sign predictor for the y-component of the MVD is positive because +MVDy was selected.

In addition to the MVD component sign predictors (e.g., MVDx sign predictor and MVDy sign predictor), video encoder 20 may determine the actual MVD component signs. If the respective MVD component sign predictors are equal to the actual MVD component signs, video encoder 20 may signal an indicator value indicating that the respective MVD component sign predictors are equal to the actual MVD component signs. If the respective MVD component sign predictors are not equal to the actual MVD component signs, video encoder 20 may signal an indicator value indicating that the respective MVD component sign predictors are not equal to the actual MVD component signs.

For example, assume that the actual MVD component signs are positive for MVDx, and positive for MVDy, and the MVDx sign predictor is negative and the MVDy sign predictor is positive. In this example, for MVDx, video encoder 20 may signal an indicator value indicating that the MVDx sign predictor is the incorrect predictor for the MVDx sign (e.g., indicator value of 0) because the actual MVDx sign is not equal to the MVDx sign predictor. For MVDy, video encoder 20 may signal an indicator value indicating that the MVDy sign predictor is the correct predictor for the MVDy sign (e.g., indicator value of 1) because the actual MVDy sign is not equal to the MVDy sign predictor.

Video decoder 30 may perform similar operations as video encoder 20 to determine the MVD component sign predictors. For example, video decoder 30, like video encoder 20, may determine that the MVDx sign predictor is negative, and the MVDy sign predictor is positive. In this example, for MVDx, video decoder 30 may receive an indicator value indicating that the MVDx sign predictor is the incorrect predictor for the MVDx sign. Accordingly, video decoder 30 may determine that the sign for MVDx is the opposite of the MVDx sign predictor (e.g., the sign for MVDx is positive). For MVDy, video decoder 30 may receive an indicator value indicating that the MVDy sign predictor is correct for the MVDy sign. Accordingly, video decoder 30 may determine that the sign for MVDy is the same as the MVDy sign predictor (e.g., the sign of MVDy is positive).

The following describes example metrics that video encoder 20 and video decoder 30 may utilize to determine the MVD component sign predictors. A variety of measures or metrics may be used to choose the MVD candidate to be used as a sign predictor. In one example, discontinuity is measured between the reconstructed block corresponding to each MVD candidate and the already decoded and reconstructed neighboring blocks. The MVD candidate that gives the smallest discontinuity may be chosen as the MVD sign predictor. In one example, the discontinuity can be calculated as a sum of absolute differences or sum of square (or any other power) differences between the boundary sample in the reconstructed block and the corresponding boundary sample in the neighboring block. The idea behind such a metric is that neighboring samples are not much different. In other words, it can be a sum of absolute gradients across horizontal and vertical edges of the reconstructed candidate and neighbor block. In another example, an absolute maximum difference or gradient can be chosen as a discontinuity measure. l0, l1, and l2 norms were described in the examples, other Ln norm can be used, or any other known norm for determining discontinuity.

In a further example, the metric may be a discontinuity measurement between reconstruction blocks corresponding to each MVD candidate and already decoded and reconstructed neighboring blocks. Video encoder 20 and video decoder 30 may determine a difference between a reconstructed block referred to by one of motion vector candidates MV1 to M4 and a block neighboring that reconstructed block. Video encoder 20 and video decoder 30 may perform such operations for all four reconstructed blocks referred to by the motion vector candidates MV1 to MV4. The determined difference may be a measure of discontinuity, and video encoder 20 and video decoder 30 may determine which reconstructed block has the smallest discontinuity.

Video encoder 20 and video decoder 30 may determine which one of the motion vector candidates MV1 to MV4 referred to the reconstructed block with the smallest discontinuity, and determine the MVD sign values for the MVD candidate that was used to determine the one of MV1 to MV4 that referred to the reconstructed block with the smallest discontinuity. Video encoder 20 and video decoder 30 may set the MVD sign values for the MVD candidate as the MVD component sign predictors in this example.

In one example, the measure or metric can be calculated as a sum of absolute differences (SAD) or sum of square (or any other power) differences (SSD) between the templates of the current block and the templates of the reference blocks pointed to by the MV candidates (MVP+MVD candidates). In another example, the measure or metric can be calculated as a mean removal SAD or mean removal SSD between the templates of the current block and the templates of the reference blocks pointed to by the MV candidates (MVP+MVD candidates). In yet another example, SAD or SSD is used but mean removal SAD or mean removal SSD is used for illumination compensated blocks. For example, the mean removal SAD or mean removal SSD used in illumination compensated blocks is to compensate the difference in the color components intensity between the current and the reference block. The templates can be an L shape template as shown in FIG. 3.

Figure 3:
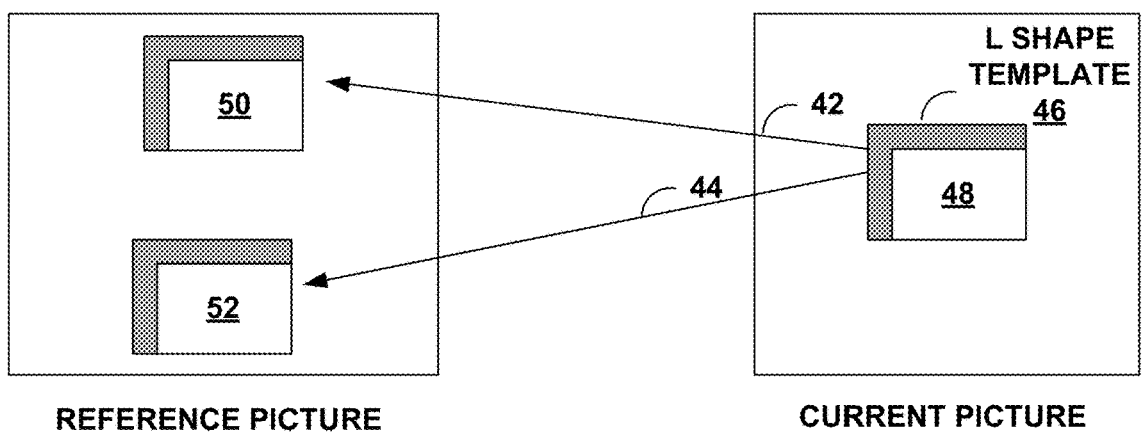
FIG. 3 is a conceptual diagram illustrating an example measure or metric for a motion vector.

For example, FIG. 3 illustrates current block 48 within the current picture. FIG. 3 also illustrates motion vector candidate 42 and motion vector candidate 44 that are determined from different MVD candidates. Motion vector candidate 42 refers to (e.g., identifies) reference block 50 in the reference picture, and motion vector candidate 44 refers to (e.g., identifies) reference block 52 in the reference picture.

The L shape template 46 around current block 48 includes pixel sample values above and to the left of current block 48. Video encoder 20 and video decoder 30 may similarly determine pixel sample values above and left of references blocks 50 and 52, as illustrated. Video encoder 20 and video decoder 30 may determine discontinuity between the L shape templates (e.g., L shape template 46 and those above reference blocks 50 and 52). Based on which template provides the least discontinuity, video encoder 20 and video decoder 30 may identify one of motion vector candidates 42 or 44. Assume that video encoder 20 and video decoder 30 identified motion vector candidate 42. In this example, video encoder 20 and video decoder 30 may determine the signs of the MVD components used to generate motion vector candidate 42, and select the signs of the MVD components as the MVD component sign predictors.

In one example, the metric used to determine the MVD component sign predictor is based on templates of the current block and templates of reference blocks pointed to by the motion vector candidates. Examples of the motion vector candidates include MV1 to MV4. The templates (e.g., L shape template 46 and those above reference blocks 50 and 52) may be pixel values in the L shape above the reconstructed blocks (e.g., reference blocks 50 and 52) referred to by MV1 to MV4, and pixel values in the L shape above the current block 48. Video encoder 20 and video decoder 30 may determine the discontinuity in the template 46 of the current block 48 relative to the templates of the reconstructed blocks (e.g., reference blocks 50 and 52) to determine which template provides the least discontinuity.

Video encoder 20 and video decoder 30 may determine the reconstructed block (e.g., one of reference block 50 or 52) having the template that provided the least discontinuity, and determine the motion vector candidate for the reconstructed block. Video encoder 20 and video decoder 30 may determine the MVD candidate used to generate the determined motion vector candidate. Video encoder 20 and video decoder 30 may set the MVD sign values for the MVD candidate as the MVD component sign predictors in this example.

The L shape template is merely one example of a template. Other example templates are possible such as a horizontal band of pixels above the blocks, or a vertical band of pixels next to the blocks.

In some examples, the measure or metric can be calculated as absolute differences or sum of square (or any other power) differences between the MV candidates (MVP+MVD candidates) and the neighboring block's MVs. For example, the metric used to determine the MVD component sign predictor is based on motion vector candidates and motion vectors of neighboring blocks. As one example, video encoder 20 and video decoder 30 may determine the difference between each one of MV1 to MV4 and the MVs of one or more blocks that neighbor the current block. Video encoder 20 and video decoder 30 may determine the motion vector candidate (e.g., one of MV1 to MV4) that is closest to the MVs of one or more blocks that neighbor the current block. Video encoder 20 and video decoder 30 may determine the MVD candidate used to generate the determined motion vector candidate. Video encoder 20 and video decoder 30 may set the MVD sign values for the MVD candidate as the MVD component sign predictors in this example.

Figure 4:
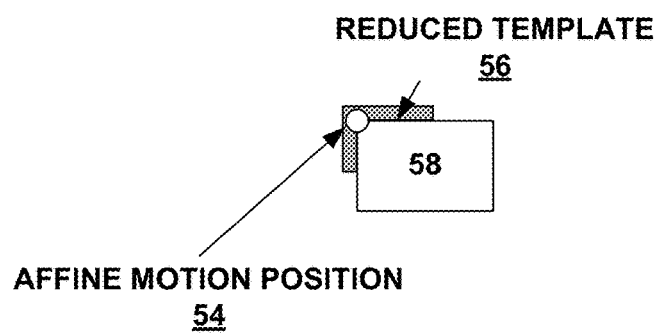
FIG. 4 is a conceptual diagram illustrating an example measure or metric for an affine motion vector.

Since an affine motion vector may represent local motion instead of motion of the whole CU, in some examples, the measure or metric of "discontinuity" or "differences between the templates" can be reduced according to affine motion position. FIG. 4 shows an example of the reduced measure of the top-left affine motion vector. For example, in FIG. 4, rather than using pixel sample values that are above the entirety of the block or to the left of the block, only a portion of the above pixel sample values and only a portion of the left pixel sample values are used. For instance, reduced templated 56 is generally L shape, but does not encompass the entire block like L shape template 46, relative to block 48 in FIG. 3. This reduced L shape for the template 56 is relative to the affine motion position 54 of the top left control point for current block 58. The templates shape for different control points may be different. For example, for top right control point of current block 58, there may be no pixel sample values available to the right because those pixel sample values have not yet been decoded. Therefore, the template for the top right control point of current block 58 may be a straight row or rows of pixel sample values, rather than L shape.

For the MV sign prediction using template matching as described above, partial pixel samples within the template are used for complexity reduction. For example, only one pixel out of every 2×2 pixels within the template is used to derive the best MVD candidate.

Another variation can be if the block is bi-predicted. In this case two MVDs can be signaled, and there can be four MVD components, each MVD can have four candidates as was shown earlier. In this case, a total of 16 pairs of MVD candidates can be derived and checked to choose one pair as sign predictors.

In another example, first the MVD, corresponding to the reference picture list 0 (L0), is derived by performing uni-directional inter prediction, as described above. After the best reconstruction for L0 is obtained, the MVD for reference picture list 1 (L1) is derived by performing bi-directional prediction with the selected L0 predictor candidate and L1 inter predictor candidate. Using the L0 predictor candidate and the L1 inter predictor candidate, video encoder 20 and video decoder 30 may determine up to four reference block sample values, from which the best reconstructed candidate is selected. Video encoder 20 and video decoder 30 assign the MVD sign predictors for L1 MVD based on the motion vector for L1 used to determine the best reconstructed candidate. In yet another example, L0 and L1 MVD candidates can be derived by performing uni-directional prediction for L0 and L1 independently, and the MVD sign predictors for L0 and L1 can be derived. In the last two examples, the number of MVD signs to be checked is reduced from 16 to 8, hence reducing the complexity. In one example, L1 predictor candidate may be derived first and then L0 predictor candidate.

Another interaction can be with an overlapped block motion compensation (OBMC) tool. This tool performs additional averaging with the inter predictor candidate derived using MVs of neighboring blocks. During MVD sign estimation, OBMC tool may not be used for the sign estimation process to reduce the complexity. In another example, OBMC is applied to the inter predictor candidates before adding the reconstructed residual.

The MV candidates (MVP+MVD candidates) can be sub-pixel motion vectors. To reduce complexity of motion compensation, the MV candidates (MVP+MVD candidates) can be rounded to integer values for calculating. In other words, the rounded candidates are used to fetch pixels for calculating measures without sub-pixel motion interpolation.

The above describes example techniques for determining the MVD component signs using the MVD component sign predictors. One example benefit of using the MVD component sign predictors is that the indicator value can be context-based encoded and decoded, which tends to use fewer bits than bypass-based coding, because the MVD component sign predictors may be biased towards sign predictor.

As described above, bypass-coding may be used when there is a 50-50 chance for a value of a bin (e.g., 50% chance of being a 0 and 50% chance of being a 1). However, if there is bias, so that the chance is no longer 50-50, then context-based coding techniques may be available and/or may improve the coding.

In various techniques, video encoder 20 may signal a flag that indicates the sign of the MVD component. Because there is 50-50 chance that sign of the MVD component is positive or negative, video encoder 20 may bypass-based code the flag. In the example techniques described in this disclosure, the indicator flag indicates whether the MVD component sign predictor is correct or incorrect. In general, the MVD component sign predictor may more often be correct than incorrect given the continuity in video. Therefore, the indicator flag that indicates whether the MVD component sign predictor is correct or incorrect may be biased towards being correct (e.g., the indicator flag is equal to 1 more often than it is equal to 0). Accordingly, video encoder 20 may context-based encode (e.g., CABAC encode) and video decoder 30 may context-based decode (e.g., CABAC decode) the indicator that indicates whether the MVD component sign predictor is equal to the actual MVD component sign (e.g., whether the MVD component sign predictor is correct or incorrect). Although, in various examples, there is higher likelihood that the indicator flag is equal to 1 than equal to 0, context-based coding (also referred to as entropy coding or context coding) may be available even if there is a higher likelihood that the indicator flag is equal to 0 than equal to 1.

In this way, the example techniques may provide a technical solution to a technical problem that improves the operation of video encoding and decoding. For example, the example techniques may allow for a way in which to context-based encode and decode (e.g., context encode or decode) information that was conventionally limited to bypass-based coding (e.g., bypass-coding).

In some examples, bypass-based coding may be sufficient for information signaling. In some examples, the complexities associated with context-based coding may be greater than the benefits of signaling fewer bits. In such examples, video encoder 20 and video decoder 30 may not perform MVD component sign prediction techniques. Rather, video encoder 20 may signal a flag that indicates whether the sign of the MVD component is positive or negative. In some cases, the MVD sign may not have a strong bias towards the sign predictor and context probability can stay around 0.5, in such cases context-based coding may be inefficient.

The following describes some possible MVD sign exceptions (e.g., times when the one or more example MVD component sign prediction techniques may not be used). MVD sign predictor may not always be efficient. In one example, MVD sign predictor is not used with OBMC since OBMC may smooth the discontinuity measure and selecting the best block reconstruction may not be obvious.

In another example, if MVD is smaller than a certain threshold, derived inter predictors might be similar and thus reconstructed block candidates could be similar. In such case, MVD sign prediction may not be used. Similarly, even if MVD is big, the final MV, after adding to MVP, could be a small, for example smaller than a certain threshold, in such cases, MVD sign prediction may not be used.

The threshold can be set, for example, to be equal to 4 (one full sample shift), or 8 or any other values. Absolute MV, MVP, MVD can be compared against the threshold, and, based on the comparison results, for example, if smaller or larger, MVD sign prediction is not applied.

In yet another example, if the MV candidate is such that interpolation is required, i.e. MV component is a fractional-pel, to derive inter prediction, MVD sign prediction for that component may not be used. Similarly, if the absolute MVD component is a fractional-pel, MVD sign prediction may not be used. In another example, MVD sign prediction is not applied if the residual is equal to zero.

In some examples, if discontinuity measures calculated for different MV candidates are not much different (e.g., difference between any two measures are not exceeding a certain threshold value), the threshold value may be bitdepth dependent, for example if 30 is the difference between two metrics, then MVD sign candidates can be treated as unreliable and MVD sign prediction is not used.

In such cases when MVD sign prediction is not used, the signaled MVD sign predictor may be treated as the actual MVD sign, or the default MVD sign predictors can be used.

The following describes MVD sign predictor flag context. If the MVD sign predictor is reliable, then the signaled MVD sign predictor flag (e.g., indicator flag) indicates that the MVD sign is equal to the predictor, for example, indicator flag is set to 1. In this case the indicator flag value may have a bias, and the indicator flag can be context coded (e.g., context-based coded), as described above.

The contexts can be selected in various ways. The contexts can be based on the following, and since the MVD sign prediction accuracy can be different the flag may have different statistics:

MVD and/or MVP component absolute value

Inter prediction direction, for example uni-L0-, uni-L1-, or bi-directional prediction Reference picture index Whether certain tools are used, for example OBMC is applied in the current block When MVD sign prediction is not used, examples described in the previous section when applicable, instead of not using MVD sign prediction, a separate context can be assigned to the MVD sign prediction flag and MVD sign prediction is applied.

The above described examples described ways in which to determine the signs of the MVD components. The following describes example techniques to determine the MVD magnitude, such as based on MVD magnitude prediction. The similar techniques described with respect to MVD sign prediction or MVD sign inference can also be used to predict the magnitude of MVD. In one example, the MVD magnitude is coded in a similar way as the transform coefficient level value, that is, a flag indicating whether the coefficient value is greater than 1, and a flag indicating whether the coefficient value is greater than 2 is coded. However, instead of coding those flags explicitly, the flag indicating whether the predicted MVD magnitude is larger than 1 and/or the flag indicating whether the predicted MVD magnitude is larger than 2, is context coded (e.g., context-based coded).

For instance, video encoder 20 may signal and video decoder 30 may receive one or more syntax elements indicating whether the MVD component values are greater than respective threshold values. The flag of greater than 1 is one example of the syntax element that indicates whether the MVD component value is greater than a threshold value of 1. The flag of greater than 2 is one example of the syntax element that indicates whether the MVD component value is greater than a threshold value of 2. For MVD component values greater than 2, video encoder 20 may signal and video decoder 30 may receive the actual MVD component values. In this way, video decoder 30 may determine the MVD component values based on the received one or more syntax elements.

In general, as can be seen from the above examples, the MVD sign prediction process can be described as follows:
1. Signal MVD sign prediction flag per non-zero MVD component.
2. Based on certain conditions, MVD sign prediction flag can be treated as actual MVD sign
3. Build MV candidates by creating combination between possible signs and absolute MVD value
4. Identify the best block reconstruction candidate based on some metric
5. Use corresponding MVD signs as sign predictors
6. Derive actual MVD by checking MVD sign flag value (value can be signaled or MVD sign can be inferred or derived without signaling), if it is one value, for example 1, set MVD sign equal to the sign predictor, if other value, for example 0, set MVD sign to the opposite sign than of the sign predictor.

Similar process(es) can be applied to other information and syntax elements. For example, a merge index predictor can be derived by using all merge candidates with an associated merge index in the merge list as MV candidates, and the merge index of the merge candidate, which is selected according to some measure (multiple examples are provided above), may be used as the merge index predictor.

In another example, AMVP flag predictor, reference index predictor, most probable mode predictor (for example intra MPM predictor), or other syntax elements can be derived in a similar way. The process description can be obtained by replacing the MVD sign with the information to be derived in the above description.

Figure 6:
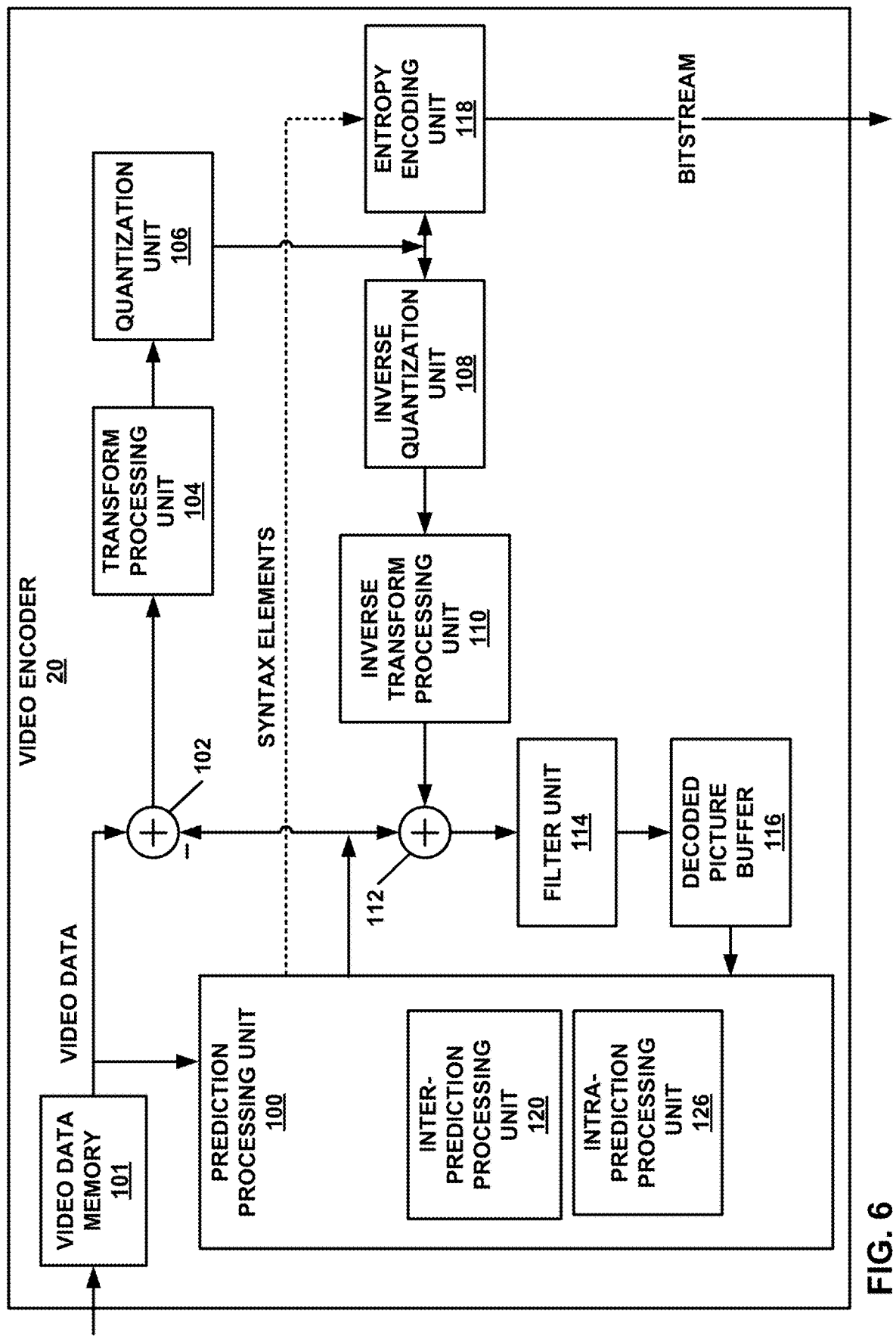
FIG. 6 is a block diagram illustrating an example video encoder that may implement one or more techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 6 may be formed as hardware circuit blocks that are interconnected with a circuit bus. These hardware circuit blocks may be separate circuit blocks or two or more of the units may be combined into a common hardware circuit block. The hardware circuit blocks may be formed as a combination of electronic components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 6 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 6, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 28 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 may support PU sizes of 2N×2N or N×N for intra prediction, and symmetric PU sizes of 2N×2N, 2N×N, N×2N, N×N, or similar for inter prediction. Video encoder 20 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform a partition of the residual blocks of a CU into transform blocks of TUs of the CU. For instance, transform processing unit 104 may perform quad-tree partitioning to partition the residual blocks of the CU into the transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

In some examples, techniques of this disclosure may be implemented using prediction processing unit 100 (or inter-prediction processing unit 120 more specifically) and entropy encoding unit 118. For example, prediction processing unit 100 may determine a motion vector difference (MVD) for a current block based on the actual motion vector for the current block and a motion vector predictor (MVP). The MVP may be derived from an advanced motion vector prediction (AMVP) technique, where the MVP is a motion vector of a neighboring block, or as part of affine mode. The MVD includes MVD component values (e.g., the absolute value of the MVD) and signs (e.g., the sign of the component values). Accordingly, prediction processing unit 100 may determine a MVD component sign for a current block based on an MVD for the current block.

Prediction processing unit 100 may determine an MVD component sign predictor. As one example, prediction processing unit 100 may determine MVD candidates, and select a sign of one of the MVD candidates as the MVD component sign predictor. The MVD candidates may be one or more MVDs having different signs for the MVD component (e.g., assume that the MVD component values are (1, 1), then the MVD candidates are (1, 1), (−1, 1), (1, −1), and (−1, −1)).

Prediction processing unit 100 may perform block reconstruction with the MVD candidates to generate reconstructed blocks, select a reconstructed block from the reconstructed blocks based on a metric, and determine an MVD candidate for the selected reconstructed block. In this example, prediction processing unit 100 may select the sign of the determined MVD candidate for the selected reconstructed block as the MVD component sign predictor.

One example of the metric includes a discontinuity measurement between reconstruction blocks corresponding to each MVD candidate and already decoded and reconstructed neighboring blocks. In some examples, the metric is based on templates of the current block and templates of reference blocks pointed to by motion vector candidates. In some examples, the metric is based on motion vector candidates and motion vectors of neighboring blocks.

Prediction processing unit 100 may determine an indicator indicative of whether an MVD component sign is equal to the MVD component sign predictor (e.g., the indicator equals 1 if MVD component sign is equal to MVD component sign predictor, and 0 if MVD component sign is not equal to MVD component sign predictor). Entropy encoding unit 118 may signal information for the indicator. For example, entropy encoding unit 118 may context encode (e.g., context-based encode using CABAC) the indicator.

Figure 7:
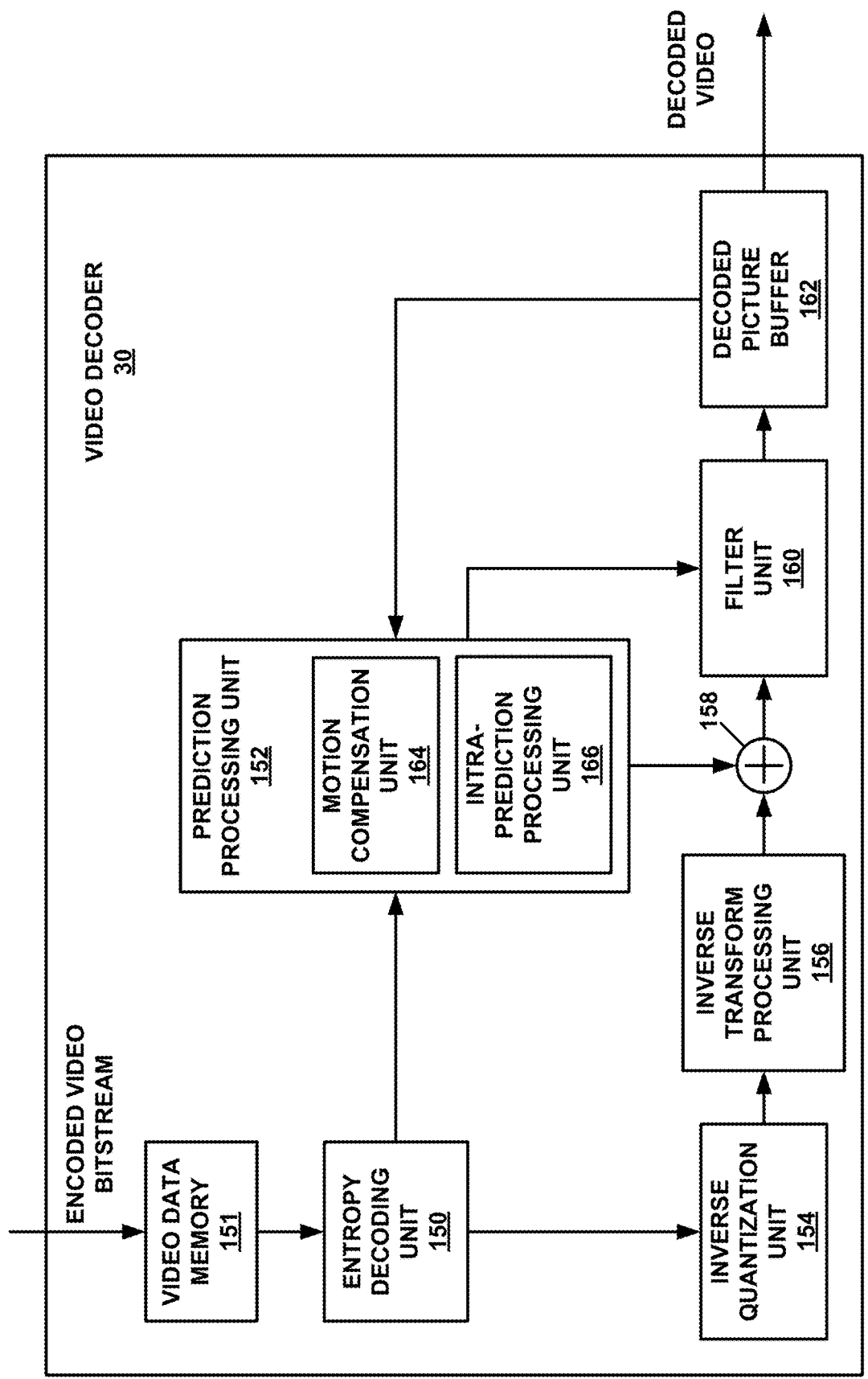
FIG. 7 is a block diagram illustrating an example video decoder that may implement one or more techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 7 may be formed as hardware circuit blocks that are interconnected with a circuit bus. These hardware circuit blocks may be separate circuit blocks or two or more of the units may be combined into a common hardware circuit block. The hardware circuit blocks may be formed as a combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 7 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 7, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

For at least one respective quantization group of multiple quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group are boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Techniques of this disclosure may be implemented using prediction processing unit 152 (and more particularly motion compensation unit 164) and entropy decoding unit 150. Prediction processing unit 152 may determine a motion vector difference (MVD) component sign predictor, and may receive an indicator indicative of whether an MVD component sign is equal to the MVD component sign predictor. Prediction processing unit 152 may determine the MVD component sign based on the MVD component sign predictor and the indicator, and determine an MVD for a current block based on the determined MVD component sign. Prediction processing unit 152 may reconstruct the current block based on the determined MVD (e.g., add MVD to the motion vector predictor to determine the motion vector for the current block, determine the predictive block from the motion vector, and add the samples of the predictive block to a residual block to reconstruct the current block).

As one example, prediction processing unit 152 may determine the MVD candidates and select a sign of one of the MVD candidates as the MVD component sign predictor. For instance, prediction processing unit 152 may receive the MVD component values (e.g., without information about the sign of the values), and from the component values, prediction processing unit 152 may determine one or more MVDs having different signs (e.g., if the (1, 1) is the component values, then (1, 1), (−1, 1), (1, −1), and (−1, −1) are the MVD candidates).

Prediction processing unit 152 may perform block reconstruction with the MVD candidates to generate reconstructed blocks, select a reconstructed block from the reconstructed blocks based on a metric, and determine an MVD candidate for the selected reconstructed block. Prediction processing unit 152 may select the sign of the determined MVD candidate for the selected reconstructed block as the MVD component sign predictor.

One example of the metric includes a discontinuity measurement between reconstruction blocks corresponding to each MVD candidate and already decoded and reconstructed neighboring blocks. In one example, the metric is based on templates of the current block and templates of reference blocks pointed to by motion vector candidates. In one example, the metric is based on motion vector candidates and motion vectors of neighboring blocks.

As described, prediction processing unit 152 may receive the MVD component values. Accordingly, prediction processing unit 152 may determine the MVD based on the received MVD component values and the determined MVD component sign.

In some examples, the indicator may be context encoded. Accordingly, entropy decoding unit 150 may context decode the indicator (e.g., context-based decode the indicator using CABAC to decode the indicator).

In addition to or instead of the above example techniques, video decoder 30 may determine MVD magnitude (e.g., MVD component values) in a manner similar to MVD component sign, determine an MVD for a current block based on the determined MVD magnitude, and reconstruct the current block based on the determined MVD.

In some examples, video decoder 30 may determine a motion vector difference (MVD) magnitude based on multiple flags, where each flag indicates whether the MVD magnitude is greater than a respective threshold value (e.g., similar to transform coefficient level value), determine an MVD for a current block based on the determined MVD magnitude, and reconstruct the current block based on the determined MVD.

Figure 8:
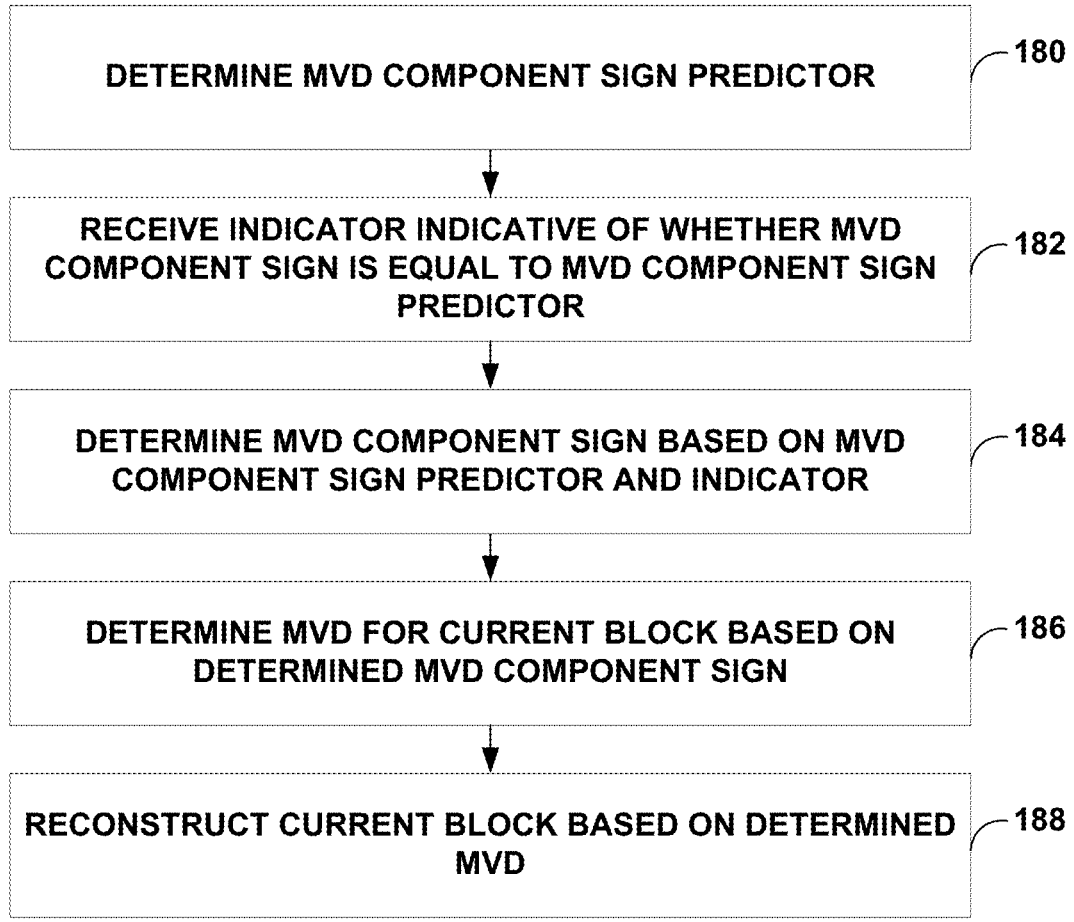
FIG. 8 is a flowchart illustrating an example method of decoding video data in accordance with techniques described in this disclosure.

FIG. 8 is a flowchart illustrating an example method of decoding video data in accordance with techniques described in this disclosure. For ease of description, the example of FIG. 8 is described with respect to entropy decoding unit 150 and prediction processing unit 152 of video decoder 30.

Prediction processing unit 152 may determine a motion vector difference (MVD) component sign predictor (180). For example, prediction processing unit 152 may determine MVD candidates (e.g., if the magnitude is (MVDx, MVDy), the MVD candidates are (+MVDx, +MVDy), (−MVDx, +MVDy), (+MVDx, −MVDy), and (−MVDx, −MVDy)). In this example, the MVD candidates include one or more MVDs having different signs for the MVD component. Prediction processing unit 152 may select a sign of one of the MVD candidates as the MVD component sign predictor.

As one example, prediction processing unit 152 may perform block reconstruction with the MVD candidates to generate reconstructed blocks. Prediction processing unit 152 may select a reconstructed block from the reconstructed blocks based on a metric, and determine an MVD candidate for the selected reconstructed block. In this example, prediction processing unit 152 may select the sign of the determined MVD candidate for the selected reconstructed block as the MVD component sign predictor.

One example of the metric includes a discontinuity measurement between reconstruction blocks corresponding to each MVD candidate and already decoded and reconstructed neighboring blocks. In some examples, the metric is based on templates of the current block and templates of reference blocks pointed to by motion vector candidates. In some examples, the metric is based on motion vector candidates and motion vectors of neighboring blocks.

Entropy decoding unit 150 may receive an indicator indicative of whether an MVD component sign is equal to the MVD component sign predictor (182). For example, entropy decoding unit 150 may receive an indicator flag that indicates whether the MVD component sign predictor is correct or incorrect. As part of the receiving, entropy decoding unit 150 may context decode (e.g., context-based decode) the indicator based on one or more contexts. Examples of the one or more contexts include one or more of an absolute value of the MVD, a corresponding motion vector predictor (MVP), an inter-prediction direction, a reference picture index, and an indication of whether particular coding tools are used.

Prediction processing unit 152 may determine the MVD component sign based on the MVD component sign predictor and the indicator (184). For example, if the MVD component sign predictor predicts that the sign of the MVD component is positive, and the indicator value is 1, then prediction processing unit 152 may determine that the sign of the MVD component is positive. If the indicator value is 0, then prediction processing unit 152 may determine that the sign of the MVD component is negative.

Prediction processing unit 152 may determine an MVD for a current block based on the determined MVD component sign (186). For example, prediction processing unit 152 may determine the MVD for the current block as being equal to the magnitude of the MVD component having the determined MVD component sign. In other words, prediction processing unit 152 may determine MVD component values (e.g., magnitude) and determine the MVD for the current block based on the determined MVD component values and the determined MVD component sign. Although described for one of the MVD components, prediction processing unit 152 may perform similar operations to determine the other MVD components. The result of the operations may be the MVD for the current block.

In some examples, prediction processing unit 152 may receive the MVD component values. In some examples, prediction processing unit 152 may receive one or more syntax elements indicating whether the MVD component values are greater than respective threshold values (e.g., flag of greater than 1, flag of greater than 2, and actual values for MVD component values greater than 2). In such examples, prediction processing unit 152 may determine the MVD component values based on the received one or more syntax elements.

Prediction processing unit 152 may reconstruct the current block based on the determined MVD (188). For example, prediction processing unit 152 may add the determined MVD to the motion vector predictor (MVP) to determine the motion vector (MV) for the current block. Based on MV, prediction processing unit 152 may retrieve sample values from a block in a reference picture. Prediction processing unit 152 may add the sample values from the block in the reference picture with values of a residual block received from video encoder 20, and reconstruct the current block. For affine mode, prediction processing unit 152 may perform similar operations to determine the MV for the control points, and based on the MV for the control points, determine a motion vector field (MVF) for the sub-blocks, and reconstruct the sub-blocks based on sample values referred to by the motion vectors of the MVF.

In the above example, prediction processing unit 152 utilized MVD sign prediction techniques to determine the MVD component sign. However, in some examples, prediction processing unit 152 may not perform the prediction techniques to determine the sign of the MVD component. For example, in the above example, assume that the current block is a first block. For a second block, prediction processing unit 152 may determine an MVD component, and determine that the MVD component (e.g., magnitude of the MVD component) for the second block is less than a threshold value. In this example, entropy decoding unit 150 may receive an indicator indicating a sign of the MVD component.

Figure 9:
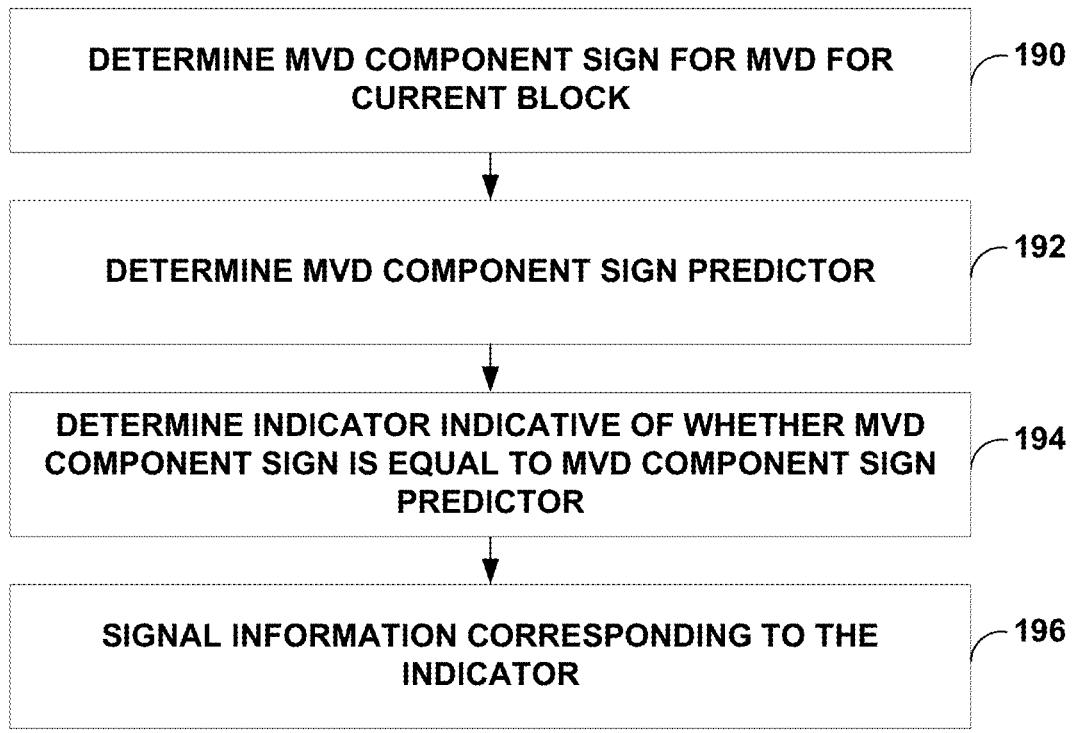
FIG. 9 is a flowchart illustrating an example method of encoding video data in accordance with techniques described in this disclosure.

FIG. 9 is a flowchart illustrating an example method of encoding video data in accordance with techniques described in this disclosure. For ease of description, the example of FIG. 9 is described with respect to prediction processing unit 100 and entropy encoding unit 118 of video encoder 20.

Prediction processing unit 100 may determine a motion vector difference (MVD) component sign for an MVD for a current block (190). For example, based on various cost functions, prediction processing unit 100 may determine the magnitude of the MVD component and the sign of the MVD component that results in optimal encoding, while balancing computational capabilities and video quality. The MVD component sign may be positive or negative.

Prediction processing unit 100 may determine an MVD component sign predictor (192). For example, prediction processing unit 100 may determine MVD candidates (e.g., if the magnitude is (MVDx, MVDy), the MVD candidates are (+MVDx, +MVDy), (−MVDx, +MVDy), (+MVDx, −MVDy), and (−MVDx, −MVDy). In this example, the MVD candidates include one or more MVDs having different signs for the MVD component. Prediction processing unit 100 may select a sign of one of the MVD candidates as the MVD component sign predictor.

As one example, prediction processing unit 100 may perform block reconstruction with the MVD candidates to generate reconstructed blocks. Prediction processing unit 100 may select a reconstructed block from the reconstructed blocks based on a metric, and determine an MVD candidate for the selected reconstructed block. In this example, prediction processing unit 152 may select a sign of the determined MVD candidate for the selected reconstructed block as the MVD component sign predictor.

One example of the metric includes a discontinuity measurement between reconstruction blocks corresponding to each MVD candidate and already decoded and reconstructed neighboring blocks. In some examples, the metric is based on templates of the current block and templates of reference blocks pointed to by motion vector candidates. In some examples, the metric is based on motion vector candidates and motion vectors of neighboring blocks.

Prediction processing unit 100 may determine an indicator indicative of whether the MVD component sign is equal to the MVD component sign predictor (194). For example, prediction processing unit 100 may compare the MVD component sign predictor to the determined MVD component sign. Based on the comparison, prediction processing unit 100 may determine whether the indicator indicates that the MVD component sign predictor is correct (e.g., MVD component sign predictor is the same as the MVD component sign) or incorrect (e.g., the MVD component sign predictor is not the same as the MVD component sign).

Entropy encoding unit 118 may signal information corresponding to the indicator (196). For example, entropy encoding unit 118 may entropy encode the indicator based on one or more contexts. Examples of the one or more contexts include one or more of an absolute value of the MVD, a corresponding motion vector predictor (MVP), an inter-prediction direction, a reference picture index, and an indication of whether particular coding tools are used.

In the above example, prediction processing unit 100 utilized MVD sign prediction techniques to signal information used to determine the MVD component sign. However, in some examples, prediction processing unit 100 may not perform the prediction techniques to signal information used to determine the sign of the MVD component. For example, in the above example, assume that the current block is a first block. For a second block, prediction processing unit 100 may determine an MVD component, and determine that the MVD component (e.g., magnitude of the MVD component) for the second block is less than a threshold value. In this example, entropy encoding unit 118 may signal an indicator indicating a sign of the MVD component.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general-purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a motion vector difference (MVD) component sign predictor;
   receiving an indicator indicative of whether an MVD component sign is equal to the MVD component sign predictor, wherein receiving the indicator comprises context decoding the indicator based on one or more contexts, and wherein the one or more contexts are based on one or more of an absolute value of the MVD, a corresponding motion vector predictor (MVP), an inter-prediction direction, a reference picture index, and an indication of whether particular coding tools are used;
   determining the MVD component sign based on the MVD component sign predictor and the indicator;
   determining an MVD for a current block based on the determined MVD component sign; and
   reconstructing the current block based on the determined MVD.

2. The method of claim 1, wherein determining the MVD component sign predictor comprises:
   determining MVD candidates; and
   selecting a sign of one of the MVD candidates as the MVD component sign predictor.

3. The method of claim 2, wherein the MVD candidates comprise one or more MVDs having different signs for MVD components of the MVD candidates.

4. The method of claim 2, further comprising:
   performing block reconstruction with the MVD candidates to generate a plurality of reconstructed blocks;
   selecting a reconstructed block of the plurality of reconstructed blocks based on a metric; and
   determining an MVD candidate for the selected reconstructed block,
   wherein selecting the sign comprises selecting the sign of the determined MVD candidate for the selected reconstructed block as the MVD component sign predictor.

5. The method of claim 4, wherein the metric comprises a discontinuity measurement between reconstruction blocks corresponding to each MVD candidate and already decoded and reconstructed neighboring blocks.

6. The method of claim 4, wherein the metric is based on templates of the current block and templates of reference blocks pointed to by motion vector candidates.

7. The method of claim 4, wherein the metric is based on motion vector candidates and motion vectors of neighboring blocks.

8. The method of claim 1, wherein the current block comprises a first block, and wherein the indicator comprises a first indicator, the method further comprising:
   determining an MVD component for a second block;
   determining that the MVD component for the second block is less than a threshold value; and
   receiving a second indicator indicating a sign of the MVD component.

9. The method of claim 1, further comprising:
   determining MVD component values,
   wherein determining the MVD for the current block comprises determining the MVD for the current block based on the determined MVD component values and the determined MVD component sign.

10. The method of claim 9, wherein determining the MVD component values comprises receiving the MVD component values.

11. The method of claim 9, wherein determining the MVD component values comprises:
receiving one or more syntax elements indicating whether the MVD component values are greater than respective threshold values; and
determining the MVD component values based on the received one or more syntax elements.

12. A method of encoding video data, the method comprising:
determining a motion vector difference (MVD) component sign for an MVD for a current block;
determining an MVD component sign predictor;
determining an indicator indicative of whether the MVD component sign is equal to the MVD component sign predictor; and
signaling information corresponding to the indicator, wherein signaling information corresponding to the indicator comprises context encoding the indicator based on one or more contexts, and wherein the one or more contexts are based on one or more of an absolute value of the MVD, a corresponding motion vector predictor (MVP), an inter-prediction direction, a reference picture index, and an indication of whether particular coding tools are used.

13. The method of claim 12, wherein determining the MVD component sign predictor comprises:
determining MVD candidates; and
selecting a sign of one of the MVD candidates as the MVD component sign predictor.

14. The method of claim 13, wherein the MVD candidates comprise one or more MVDs having different signs for MVD components of the MVD candidates.

15. The method of claim 13, further comprising:
performing block reconstruction with the MVD candidates to generate a plurality of reconstructed blocks;
selecting a reconstructed block of the plurality of reconstructed blocks based on a metric; and
determining an MVD candidate for the selected reconstructed block,
wherein selecting the sign comprises selecting the sign of the determined MVD candidate for the selected reconstructed block as the MVD component sign predictor.

16. The method of claim 15, wherein the metric comprises a discontinuity measurement between reconstruction blocks corresponding to each MVD candidate and already decoded and reconstructed neighboring blocks.

17. The method of claim 15, wherein the metric is based on templates of the current block and templates of reference blocks pointed to by motion vector candidates.

18. The method of claim 15, wherein the metric is based on motion vector candidates and motion vectors of neighboring blocks.

19. The method of claim 12, wherein the current block comprises a first block, and wherein the indicator comprises a first indicator, the method further comprising:
determining an MVD component for a second block;
determining that the MVD component for the second block is less than a threshold value; and
signaling a second indicator indicating a sign of the MVD component.

20. An apparatus for decoding video data, the apparatus comprising:
one or more storage media configured to store video data; and
a video decoder coupled to the one or more storage media and comprising one or more fixed-function or programmable processing circuits, wherein the video decoder is configured to:
determine a motion vector difference (MVD) component sign predictor;
receive an indicator indicative of whether an MVD component sign is equal to the MVD component sign predictor, wherein to receive the indicator, the video decoder is configured to context decode the indicator based on one or more contexts, and wherein the one or more contexts are based on one or more of an absolute value of the MVD, a corresponding motion vector predictor (MVP), an inter-prediction direction, a reference picture index, and an indication of whether particular coding tools are used;
determine the MVD component sign based on the MVD component sign predictor and the indicator;
determine an MVD for a current block based on the determined MVD component sign; and
reconstruct the current block based on the determined MVD.

21. The apparatus of claim 20, wherein to determine the MVD component sign predictor, the video decoder is configured to:
determine MVD candidates; and
select a sign of one of the MVD candidates as the MVD component sign predictor.

22. The apparatus of claim 21, wherein the MVD candidates comprise one or more MVDs having different signs for MVD components of the MVD candidates.

23. The apparatus of claim 21, wherein the video decoder is configured to:
perform block reconstruction with the MVD candidates to generate a plurality of reconstructed blocks;
select a reconstructed block of the plurality of reconstructed blocks based on a metric; and
determine an MVD candidate for the selected reconstructed block,
wherein to select the sign, the video decoder is configured to select the sign of the determined MVD candidate for the selected reconstructed block as the MVD component sign predictor.

24. A computer-readable storage medium storing instructions thereon that when executed cause one or more processors of an apparatus for decoding video data to:
determine a motion vector difference (MVD) component sign predictor;
receive an indicator indicative of whether an MVD component sign is equal to the MVD component sign predictor, wherein the instructions that cause the one or more processors to receive the indicator comprise instructions that cause the one or more processors to context decode the indicator based on one or more contexts, and wherein the one or more contexts are based on one or more of an absolute value of the MVD, a corresponding motion vector predictor (MVP), an inter-prediction direction, a reference picture index, and an indication of whether particular coding tools are used;
determine the MVD component sign based on the MVD component sign predictor and the indicator;
determine an MVD for a current block based on the determined MVD component sign; and reconstruct the current block based on the determined MVD.

* * * * *